(12) United States Patent
Swamidass

(10) Patent No.: US 8,459,020 B1
(45) Date of Patent: Jun. 11, 2013

(54) WAVE AND WATER ENERGY CONVERTER MOUNTED ON BRIDGE SUPPORTS

(76) Inventor: Paul M Swamidass, Auburn, AL (US)

(*) Notice: Subject to any disclaimer, the term of this patent is extended or adjusted under 35 U.S.C. 154(b) by 0 days.

(21) Appl. No.: 13/429,375

(22) Filed: Mar. 24, 2012

(51) Int. Cl.
*F03B 17/02* (2006.01)
*F03B 13/18* (2006.01)
*F03B 13/00* (2006.01)
*F03B 13/10* (2006.01)
*F03D 7/00* (2006.01)

(52) U.S. Cl.
USPC .............. 60/495; 60/502; 290/43; 290/54; 415/4.2

(58) Field of Classification Search
USPC ...... 60/495–507; 290/42, 43, 53, 54; 415/2.1, 415/4.1, 4.2, 4.4, 7; 417/330–334
See application file for complete search history.

(56) References Cited

U.S. PATENT DOCUMENTS

| 3,604,942 | A | * | 9/1971 | Nelson | 290/54 |
| 4,392,060 | A | * | 7/1983 | Ivy | 290/53 |
| 5,440,175 | A | * | 8/1995 | Mayo et al. | 290/54 |
| 6,534,881 | B1 | * | 3/2003 | Slavchev | 290/54 |

* cited by examiner

*Primary Examiner* — Kenneth Bomberg
*Assistant Examiner* — Christopher Jetton

(57) ABSTRACT

Highway bridge supporting structures that stand in large bodies of water are usefully employed in a novel manner in this invention to inexpensively extract energy from the water under the bridge using new and established apparatus. Alternate energy producing systems from water waves, currents and tides suffer from cost disadvantages incurred in designing and erecting expensive structures that hold them firmly on the ground under the water against fierce wind and water forces. This invention ingeniously uses existing or new bridge structures for mounting water-borne-energy to electricity conversion systems at much reduced cost. The invention will make water energy conversion systems more affordable and will turn existing and new bridge supporting structures into dual-use systems that can not only support bridge decks above but also produce useful renewable energy from the water below; today, bridge structures are not used in this manner.

6 Claims, 13 Drawing Sheets

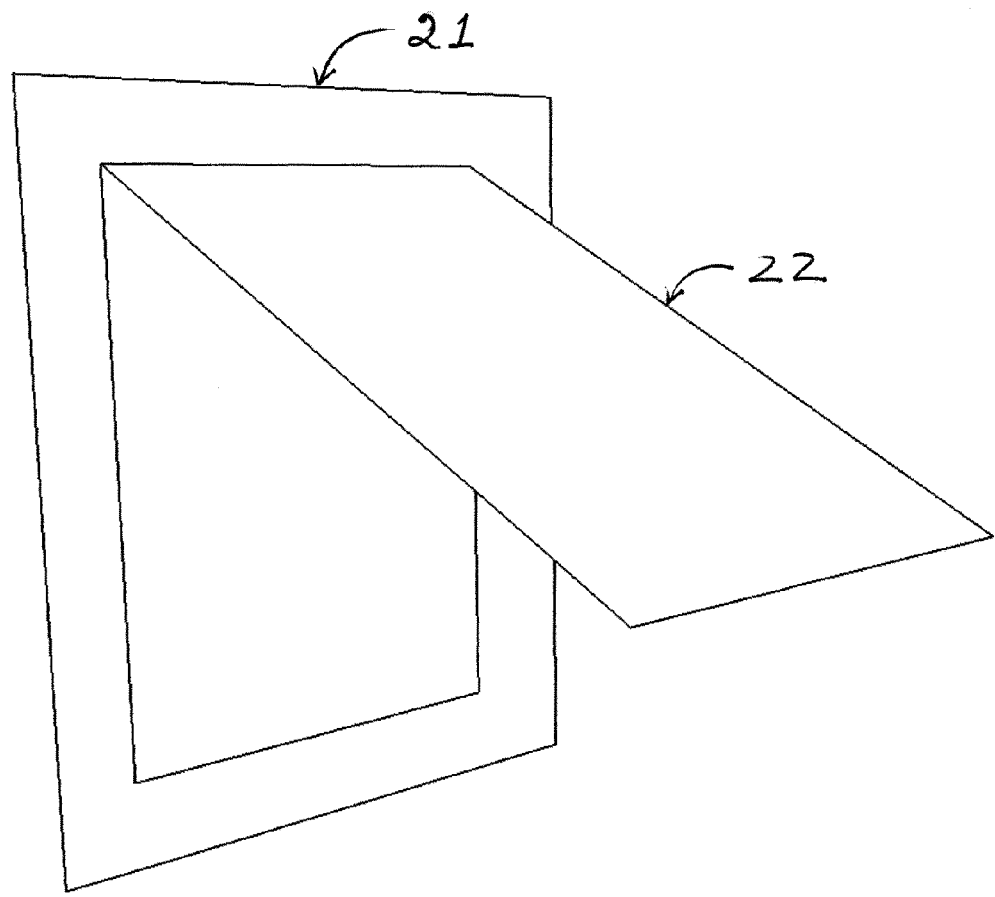

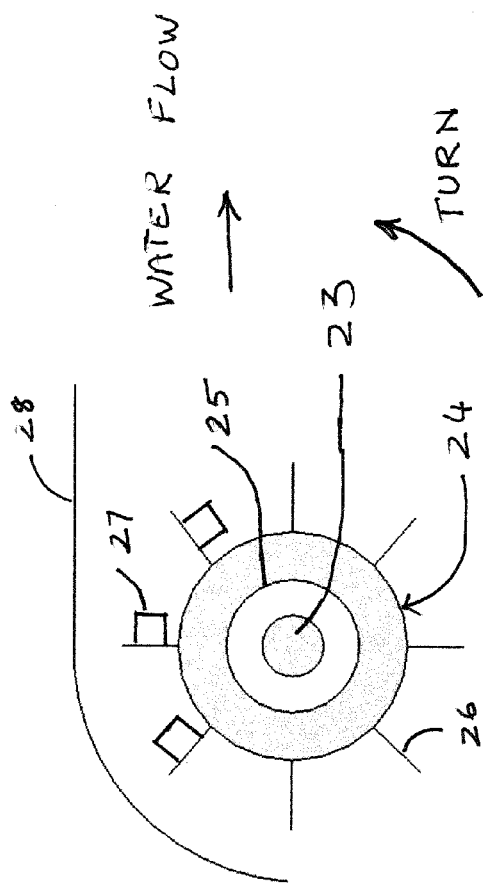

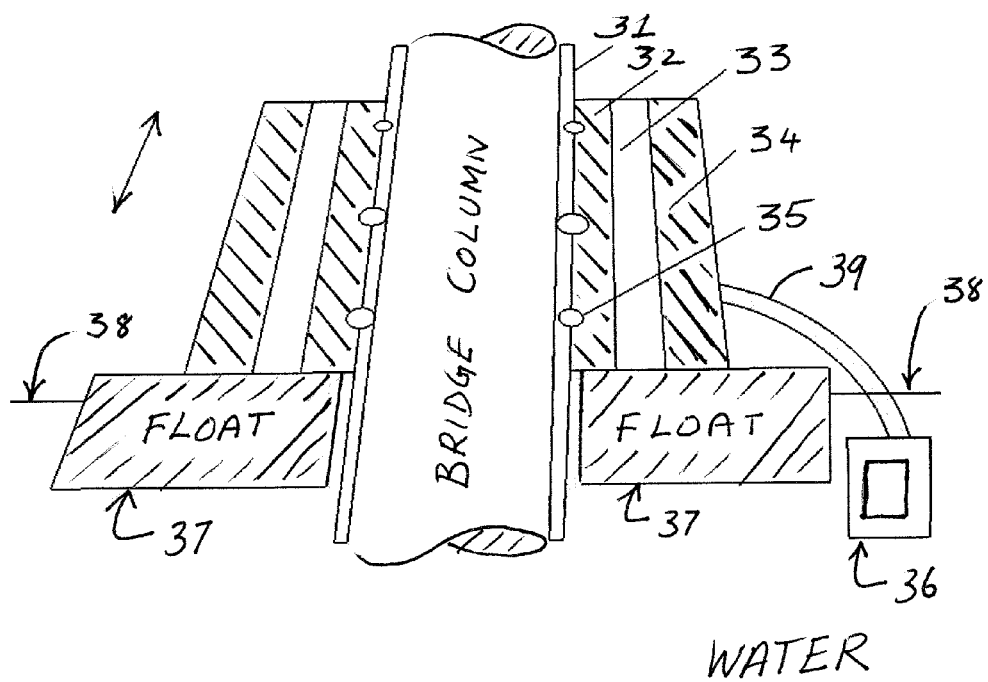

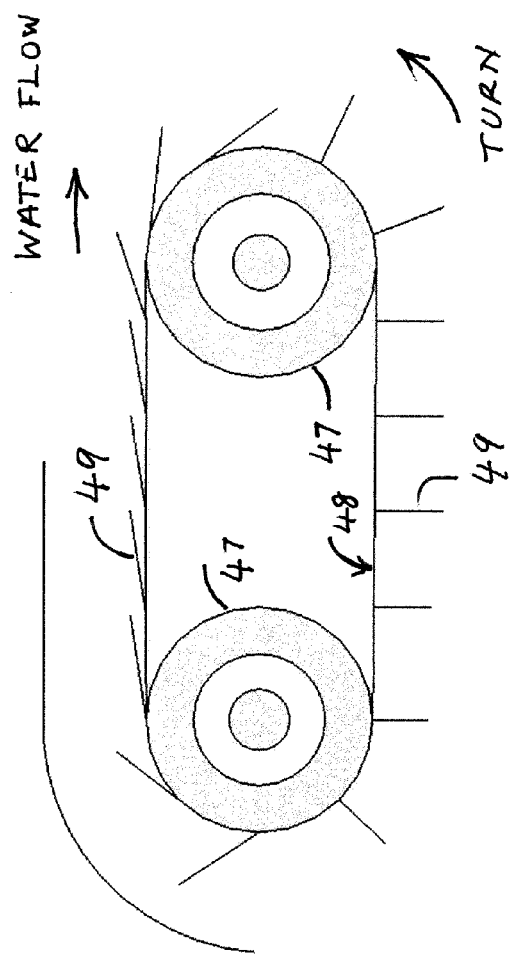

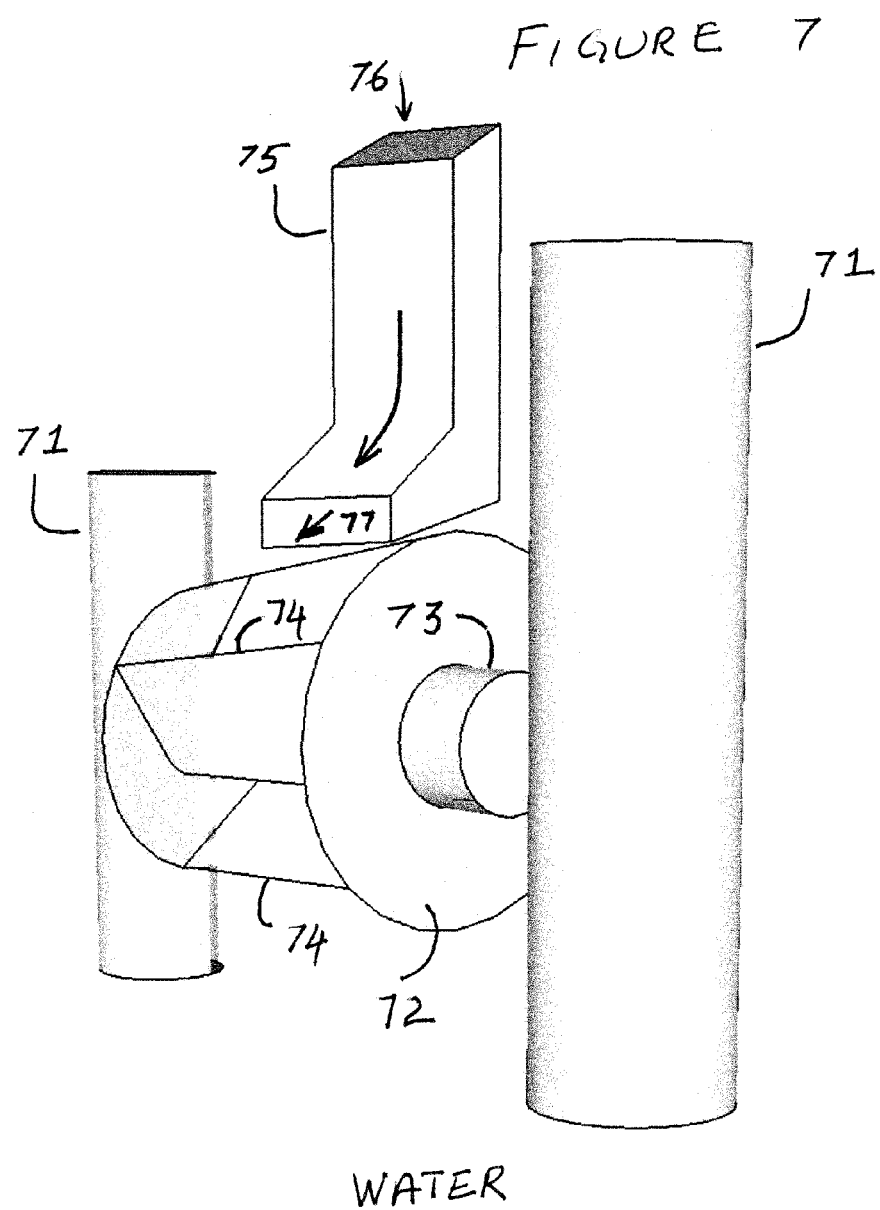

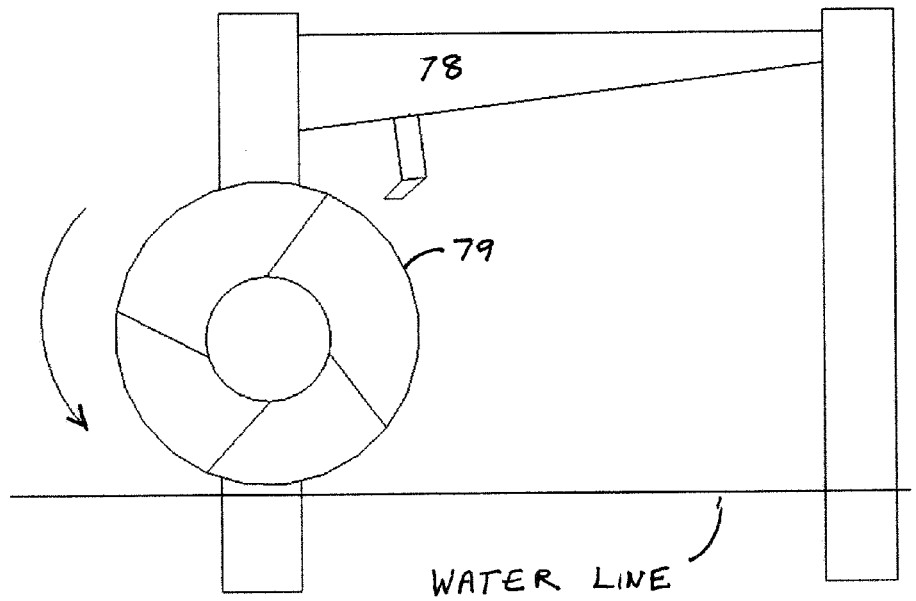

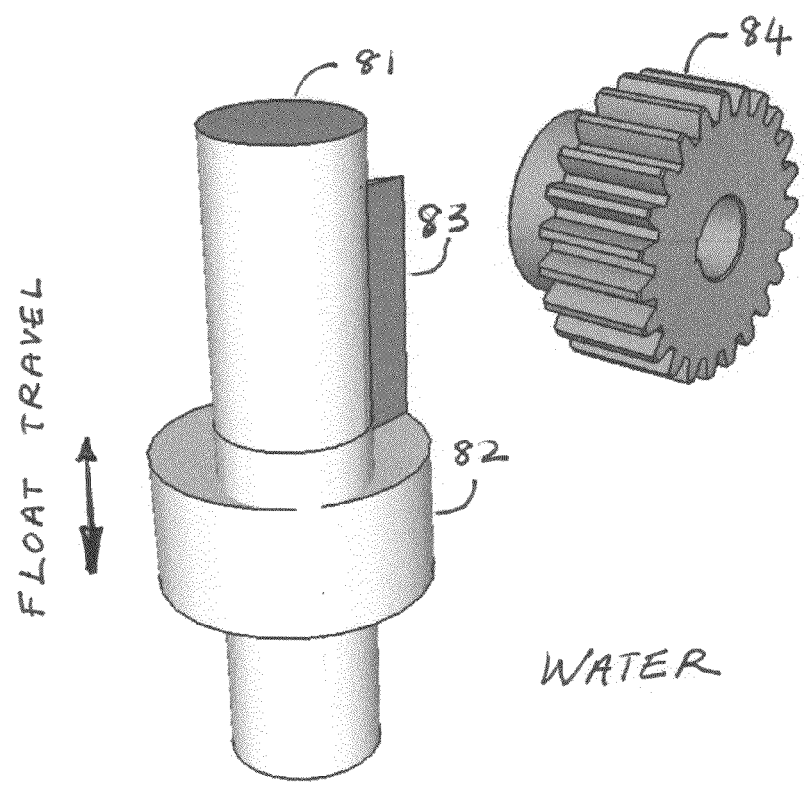

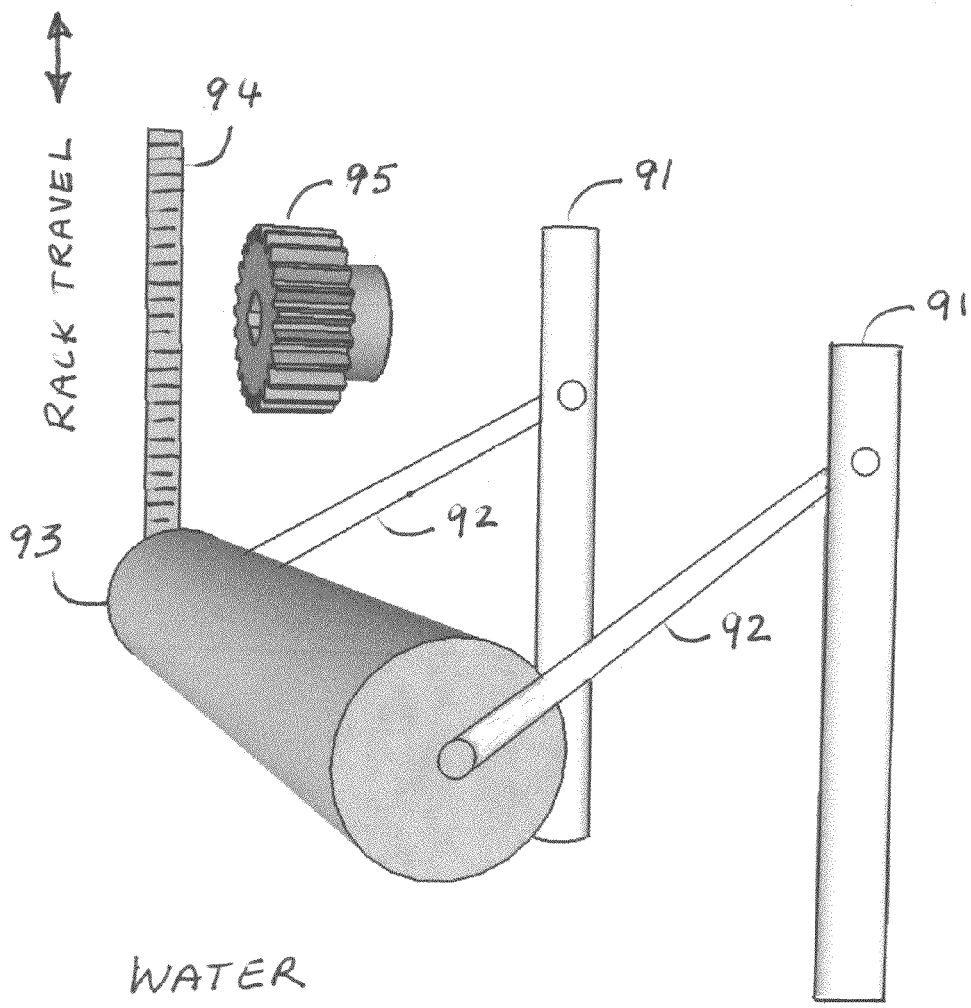

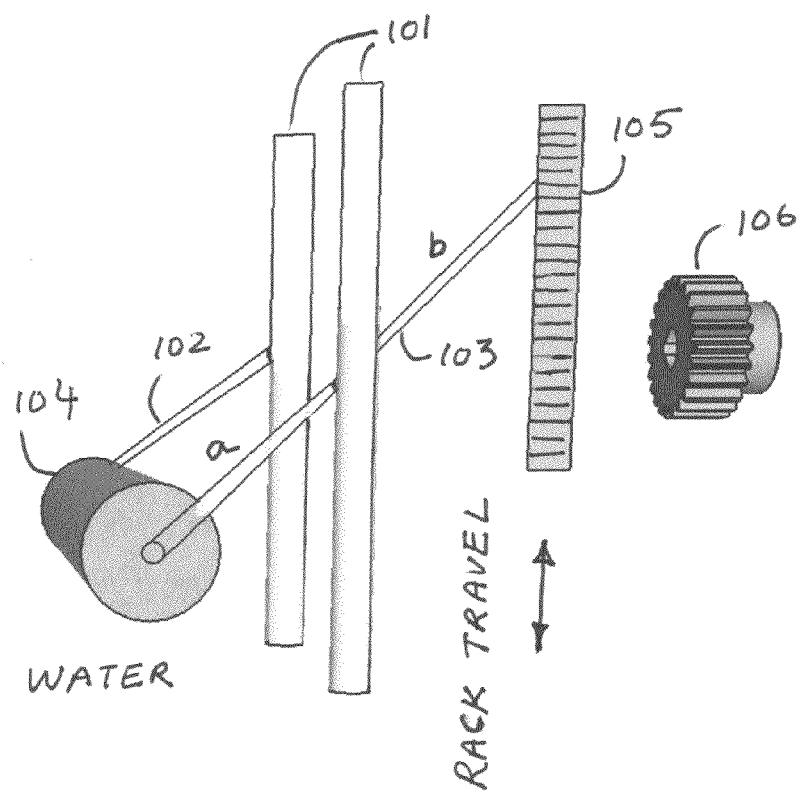

US 8,459,020 B1

WAVE AND WATER ENERGY CONVERTER MOUNTED ON BRIDGE SUPPORTS

FIELD OF THE INVENTION

The invention generally relates to the green, renewable alternate energy industry, and particularly to wave and water energy conversion (WWEC) industry by the novel use of bridge supporting structures. The apparatus takes advantage of the strong columns supporting the highway deck overhead. The invention substantially cuts the cost of WWEC systems because these systems may be retrofitted to existing bridge columns as well as to new bridge columns for supporting new highway decks; the cost of the column supporting the energy conversion systems will be associated with the cost of the bridge with this novel invention. Consequently, the cost of the water-energy conversion system becomes substantially lower than what it could have been without using the bridge structure; this invention will turn bridge columns into dual-use structures.

BACKGROUND OF THE INVENTION

Water in ocean, sea and rivers offer plenty of energy but the technology to harvest the energy from water is still in the experimental stages. Wave, water currents and tidal energy converters are not yet fully exploited. One of the problem is the cost of such systems.

Existing technologies for WWEC systems require expensive investment in civil and mechanical systems to retain these systems in boisterous water during severe weather, WWEC systems face fierce forces on account of winds and associated water forces along coasts. The magnitude of forces that fierce winds and waves produce in large bodies of water can cause irreparable damage to the energy systems. Therefore WWEC systems require prohibitively expensive civil and mechanical structures to retain them in place during fierce storms.

Highways over water are built on extremely strong columns that are capable of withstanding fiercest wind and water forces. These columns would serve as inexpensive mounts for WWEC systems in this invention. This invention would turn thousands of bridge columns into duel-use columns: one use being the support of highway decks above, and the second being the support of WWEC systems below the highway decks.

GENERAL DESCRIPTION OF THE INVENTION

Bridge columns offer multiple opportunities to harvest wave and related energy from water under the bridge. Bridge-column based WWEC systems include the following embodiments but are not limited to them. The technologies listed below are to be of the appropriate scale to prevent overloading of the bridge columns beyond their designed strength. The embodiments below can be mounted on bridge-supporting columns already in use (retrofitted) or designed in the future as part of new bridge structures over water. The novelty of this invention is evident from the fact that under-the-bridge structures have not been used in this manner to generate green energy.

There are no known devices attached to bridge columns for harvesting energy in the water under bridges. The invention includes the following multiple embodiments but not limited to them.

Embodiment 1

Vertical, Floating Water Turbines that Slide on Bridge Columns

This invention is a floating water turbine that slides up and down the bridge column with the waves column while the turbine is rotated by water currents, waves or tides turning turbine blades dipping into the water to produce electricity in a generator driven by the water turbine. The generator feeds power to the power grid. The generator could be housed concentrically inside the turbine rotor or outside the rotor.

Brief Description of the Drawings for Embodiment 1

To explain the invention, a specific embodiment thereof is described with reference to FIGS. 1 through 4.

FIG. 2 is a perspective of the turbine blades with flap.

FIG. 2a is a top view of the apparatus without the bridge deck above.

FIG. 3 is a cross-section of the apparatus through the column, turbine, and float.

FIG. 4a shows the top view with two turbines driven by a single belt with a plurality of water turbine blades attached to it.

Detailed Description of Embodiment 1

Figure 1:
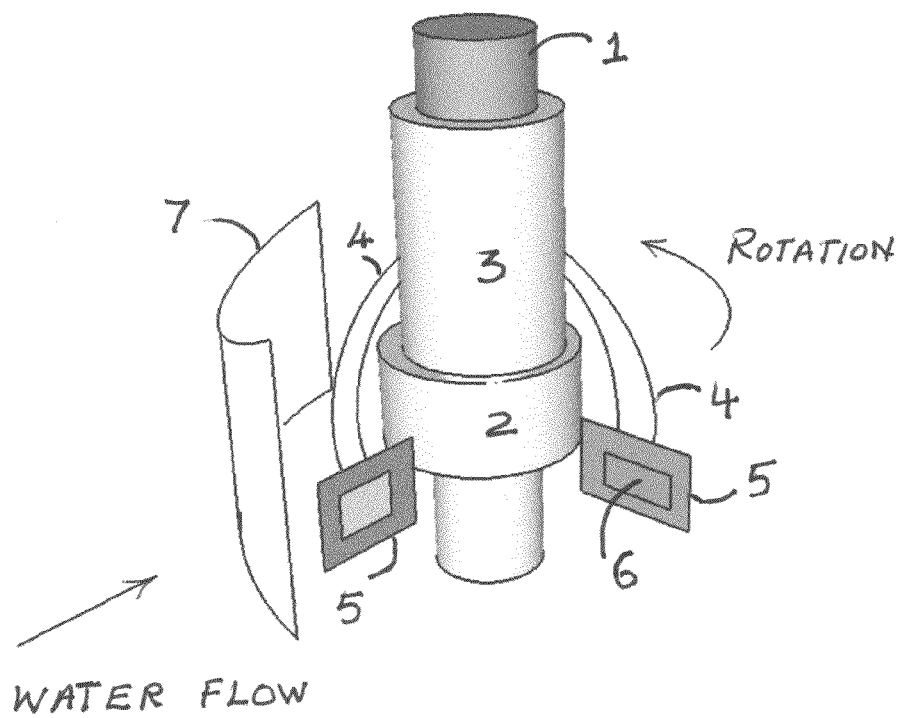
FIG. 1 is a perspective view of the invention where a vertically sliding, floating rotary turbine with blades dipping in water is mounted on one of the vertical columns of the bridge—the electric generator is internal to the turbine. The float does not rotate.

Referring to FIG. 1 of the drawings, a float 2 wrapping around the bridge column 1 supports the floating rotary turbine with an internal electricity generator; the float does not rotate with the turbine. Two of the multiple blades 5 of the turbine are shown in HG 1, and they are designed with flaps 6 that are dosed going downstream but are open going upstream to reduce water resistance on the upstream side. The flaps are designed to maximize the opening on the upstream side to allow water to flow through the blade with little resistance—this is accomplished by maximizing the ratio of flap area with respect to the total blade area.

The blades 5 are submerged in water but are attached to the turbine rotor 3 by arms 4. To reduce resistance to the rotation of the turbine blades, a flow deflector 7 diverts the incoming water away from the blades going upstream, but the water flow is unrestricted on the downstream side of the rotor in order to absorb energy from the water flow or waves or tides. Current, waves and tides apply rotary force on the downstream side to rotate turbine blades 5.

The detailed drawing of the blade in FIG. 2 shows blade 21 with flap 22. The drawing shows a substantially open flap in the upstream side offering least resistance to the rotation of the blade in the upstream side. The blade apparatus may use a powered assist to open and close the flap.

In the top view of the apparatus in FIG. 2a, 23 is the bridge column, 24 is the float supporting the generator 25 and 26 are the blades attached to generator 25; the arms connecting the blades to generator 25 are not included for clarity of the figure. In the upstream side, 27 are the flaps shown in the open position in the upstream side of the apparatus; in the open position, the blades have minimal resistance to the counter clockwise turning turbine and blades. In the upstream side, the blade flaps remain closed. 28 is the flow diverter on the upstream side.

The detailed cross-section in FIG. 3 shows a lubricated slider 31 on bearings that allows the assembly consisting of the water turbine+blades+generator+float slide up and down the bridge column on bearings 35. Vertically sliding but non-rotating stator of the generator is 32 and 34 being the rotor of the electric generator rotated by a plurality of blades 36 submerged under the water line 38. Each blade 36 is attached to the rotor by a rigid arm 39. The turbine and generator are kept afloat above the water line 38 by the non-rotating float 37 rigidly fixed to the stator 32. The float keeps the stator and rotor above the water line. The gap between the stator 32 and rotor 34 is represented by 33.

Figure 4:
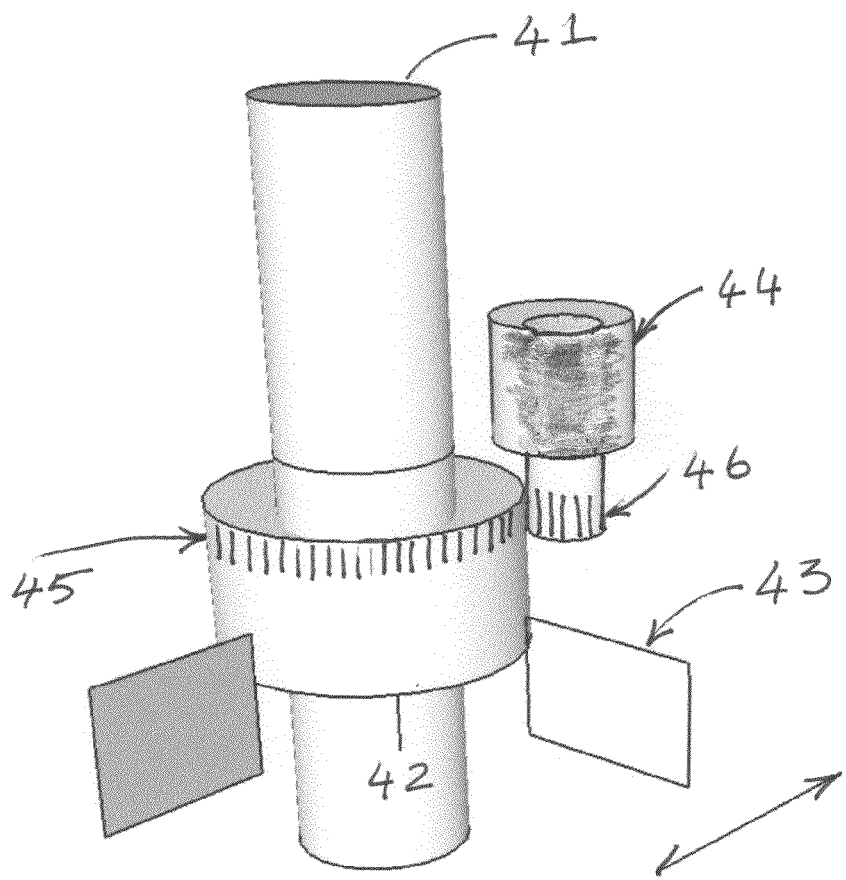
FIG. 4 is perspective of the turbine where the generator is external to the turbine.

FIG. 4 shows that the generator 44 may be mounted outside the turbine rotor+float combination 42 sliding on bridge column 41. Turbine has external gears 45 that drive the pinion 46 on the electric generator shaft. Water turbine 42 is turned by a plurality of blades 43 (only two blades shown).

FIG. 4a shows the top view of two circular float+turbines+generator combinations 47 wrapped around two bridge columns as a variation of one turbine apparatus shown in FIG. 2a. Belt 48 with gear teeth on the side facing the turbine mesh with gear teeth on the outside of the turbine rotor and turn the turbine when the belt is moved anti-clockwise by water energy. The belt has a plurality of equally spaced turbine blades 49 attached to it. The blades are hinged on Belt 48 so that on the upstream side, the blades fold down to minimize water resistance to the blades moving upstream.

Embodiment 2

Pump Lifts Water to an Overhead Tank—Falling Water Turns Turbine

A large float, which bobs up and down with the waves under a bridge, is attached to one or more rigid arms that are hinged at a high point in the bridge columns. The float or arms are connected to a reciprocating or rotary pump(s) to pump water up to fill water in a large overhead tank located just under the bridge deck. The elevated water in the tank is released through ducts to drive a water turbine(s) below to produce electric power. After driving the turbine, the spent water falls back into the body of water under the bridge.

Embodiment 2 could be used to pressurize air, gas or any fluid to drive turbines that turn electric generators.

Brief Description of Drawings for Embodiment 2

Figure 5:
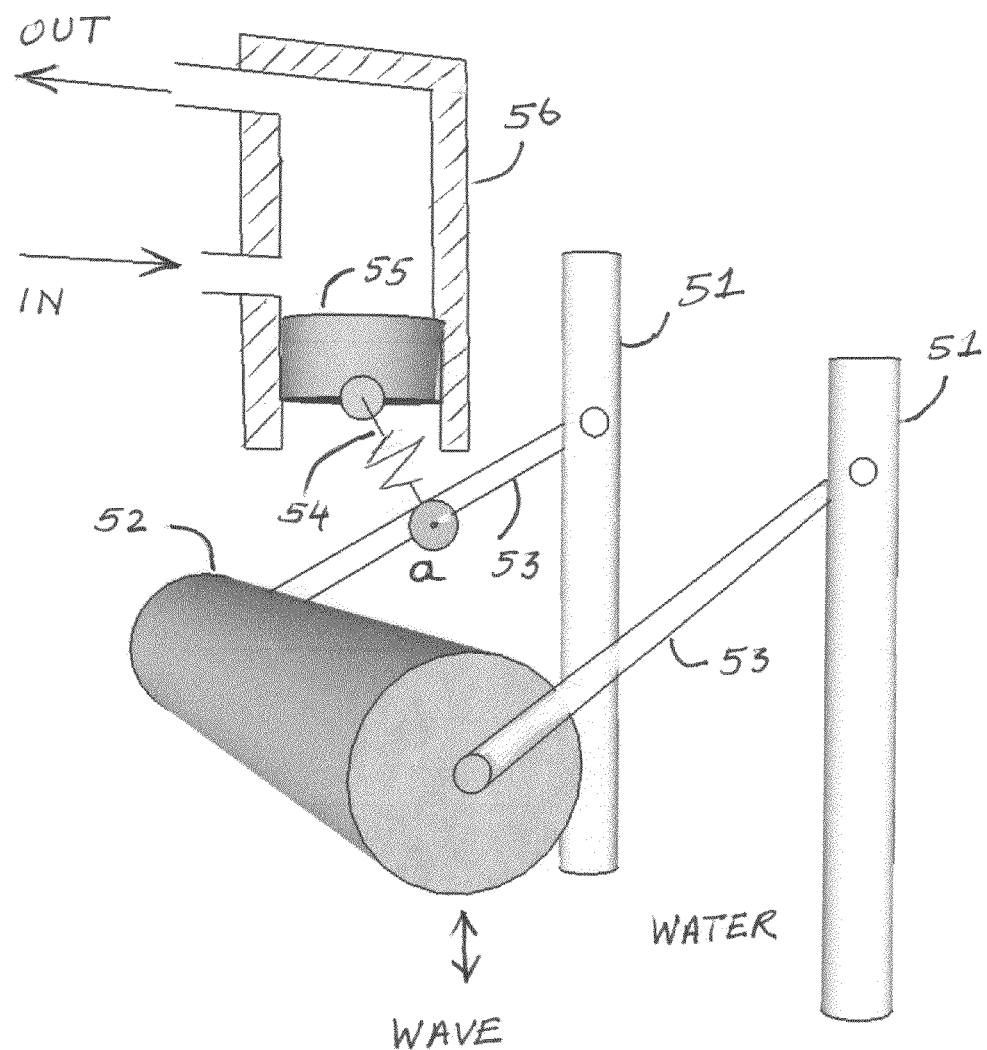

FIG. 5: It is a perspective view—bobbing tubular float provides reciprocating motion to a piston in a pump cylinder that lifts water to a tank that hangs just under the highway deck on the top of the bridge columns. Float is connected to long arms hinged to two columns.

Figure 6:
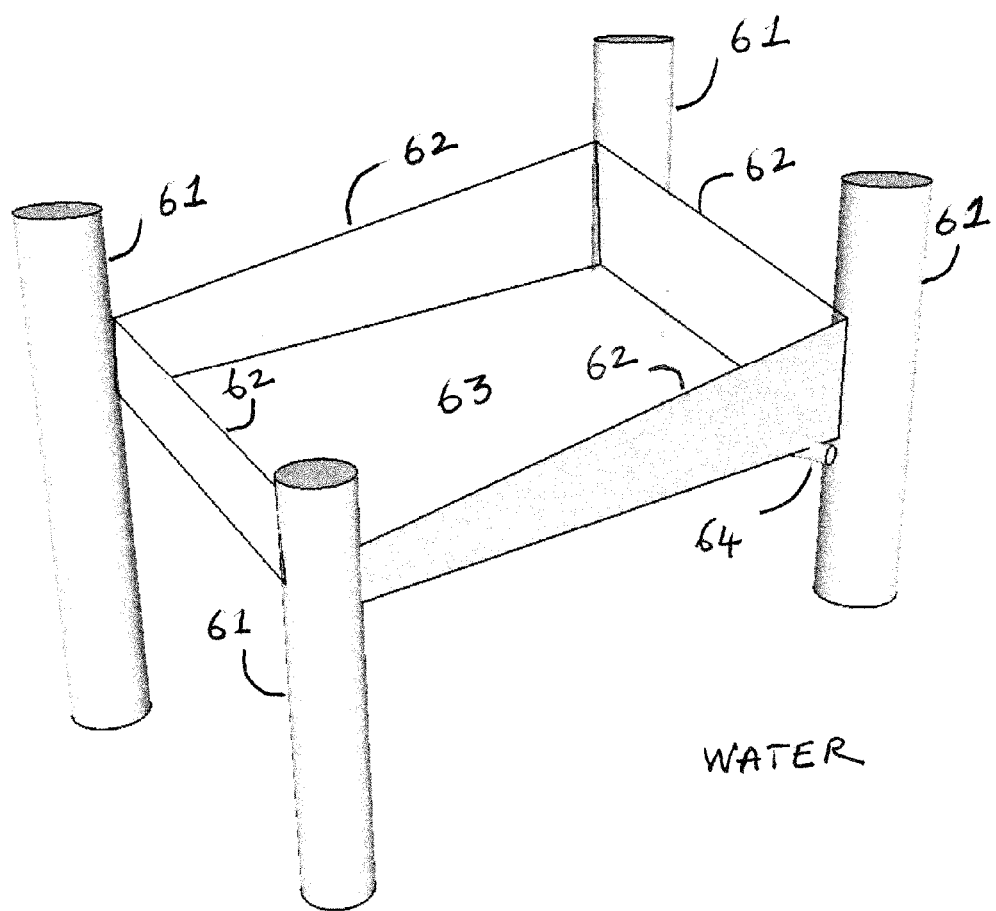

FIG. 6: It is a perspective of a water tank supported by four bridge columns to hod water pumped up by the float-pump combination.

FIG. 7: Water from the tank is let down through a spout to drive a water turbine that turns an electricity generator.

Detailed Description of Embodiment 2

FIG. 5 shows two long arms 53 that are hinged at two bridge columns 51. A large cylindrical float 52, which floats on the water below the bridge, is attached to the ends of the hinged arms 53 allowing the cylindrical float to bob up and down with the waves. The arm 53 is hinged to a connecting rod 54 which is attached to a reciprocating piston 55 inside a cylinder 56. The location "a" of the connection rod 54 on the arm 53 may be varied to vary the stroke and power of the piston stroke. FIG. 5 shows the location of "a" on the arm 53 between the column and the float but "a" could be placed on an extension of arm 53 beyond the column 51 for appropriate leverage. The water enters at "IN" and is pressurized in the pump and goes "OUT" to an overhead tank in FIG. 6.

FIG. 6 shows a large water tank to hold the water that is pumped up by the bobbing float in FIG. 5. Four columns 61 hold the tank up, the tank sides are 62, the bottom of the tank is 63. The water from the tank is led out from spout 64 to a water turbine below.

FIG. 7 shows one embodiment of the water turbine 72, whose horizontal shaft 73 is supported by two bridge columns 71. The turbine has a plurality of blades 74. The turbine is turned by the water coming down by duct(s) 75 from the overhead tank in FIG. 6—water enters the duct at 76 and comes out at 77 before turning the turbine blades.

The shaft 73 is supported above the waterline by floats (not shown in the figure) so that the shaft is held high enough for the turning turbine blades to clear the water surface.

FIG. 7a is a side view of the apparatus showing overhead reservoir 78 with water duct allowing the directed flow of water to water turbine 79 kept floating above the waterline.

Embodiment 3

Rack and Pinion Drives an Electric Generator

In this embodiment, the vertical movement of the wave is translated to a linear motion of a geared rack, which drives a pinion attached to an electric generator. The generator shaft has a flywheel to smooth the ensuing rotary motion and power of the generator because the power flowing from the vertical up and down motion of the wave is cyclical, not constant.

Brief Description of Drawings for Embodiment 3

FIG. 8: shows a cylindrical float 82 surrounding a cylindrical bridge column 81 transfers vertical motion of the wave to a pinion 84 that turns an electric generator.

FIG. 9: shows a cylindrical float at the ends of arms hinged to bridge columns 91 transfers vertical motion of the wave to a geared rack that turns a pinion 95 attached to an electric generator.

FIG. 10: shows a cylindrical float at the ends of arms hinged to a bridge columns 101 transfers magnified vertical motion of the wave to a geared rack at the extension of the arm; the vertical motion of the rack turns a pinion attached to an electric generator.

Detailed Description of Embodiment 3

FIG. 8 shows bridge column 81 on which slides a cylindrical float 82 with an attached vertical geared rack 83. Float 82 rests on the water and bobs up and down with the waves causing the rack 83 to move up and down. Pinion 84 is rotated by the rack 83 by its linear motion. Pinion 84 rotates an electric generator.

FIG. 9 shows two bridge columns 91 that have two hinged arms 92 with a large float 93 attached to their ends. Float 93 rests on the surface of water. Waves move the float up and down. The vertical movement of the float is transferred to the vertical geared rack 94 which rotates a pinion 95 attached to a electric generator shaft.

FIG. 10 shows two bridge columns 101 support a float 104 at the end of arms 102 and 103. Arm 103 is longer than arm 102, where the segment "b" of the arm 103 may be made longer than segment "a" to magnify the vertical movement of the float. The vertical motion of the arm is transferred to a geared rack 105 which rotates a pinion 106 attached to a electric generator shaft.

What is claimed is:

1. A system for converting wave and water energy comprising:
   a. a bridge including at least one support column disposed in a body of water;
   b. a float at least partially above the surface of the water and including a central passage slidably receiving the column; and
   c. a turbine-generator supported on an upper surface of the float, and comprising:
      i. a stator including a central passage slidably connected to the column;
      ii. a rotor including a central passage, the stator positioned inside the rotor;
      iii. a plurality of rigid arms circumferentially spaced on an outside surface of the rotor; and
      iv. a blade connected to each of the rigid arms, the rigid arms extending the blades below the surface of the water.

2. The system for converting wave and water energy of claim 1, further comprising:
   a. a flow diverter on the upstream side of the turbine-generator to block the current and waves and minimize water resistance on the blades rotating in an upstream direction.

3. The system for converting wave and water energy of claim 1, further comprising:
   a. a large opening on the surface of each blade to allow water to flow through without resistance; and
   b. hinged flaps closing the openings to prevent water from flowing through the blade, wherein water flows through the openings when the blades rotate upstream and the flaps close when the blades rotate downstream.

4. The system for converting wave and water energy of claim 1, further comprising:
   solid, flapless blades hinged to the rigid arms to fold flat against the flow of water when the blades rotate upstream, and radially extend to resist the flow of water when the blades rotate downstream.

5. A system for converting wave and water energy comprising:
   a. a bridge including at least two support columns disposed in a body of water;
   b. at least two floats, each float at least partially above the surface of the water and including a central passage, each central passage slidably receiving one of the columns;
   c. at least two turbine-generators, each turbine-generator supported on an upper surface of each of the floats, and each turbine-generator comprising:
      i. a stator including a central passage slidably connected to the column;
      ii. a rotor including a central passage, the stator positioned inside the rotor; and
      iii. a plurality of gear teeth placed on an outside surface of the rotor; and
   d. an endless belt including a plurality of gear teeth on the inside surface of the belt engaging with each of the rotor gear teeth, and a plurality of blades on the outside surface of the belt extending below the surface of the water.

6. A system for converting wave and water energy comprising:
   a. a bridge including at least one support column disposed in a body of water;
   b. a float at least partially above the surface of the water and including a central passage slidably and rotatably receiving the column;
   c. a plurality of rigid arms circumferentially spaced on the outside surface of the float;
   d. a blade connected to each of the rigid arms, the rigid arms extending the blades below the surface of the water;
   e. an external gear on the circumference of the float; and
   f. an electric generator engaged with the external gear.

* * * * *